United States Patent [19]
Taylor

[11] 3,808,801

[45] May 7, 1974

[54] FUEL CONTROL SYSTEM FOR GAS TURBINE ENGINE

[76] Inventor: John Sassons Taylor, 113 Ferndown Rd., Solihull, Warwickshire, England

[22] Filed: Dec. 28, 1971

[21] Appl. No.: 213,125

[30] Foreign Application Priority Data
Jan. 6, 1971  Great Britain .................... 559/71

[52] U.S. Cl. .................................. 60/39.28 R
[51] Int. Cl. ........................................ F02c 9/10
[58] Field of Search .................... 60/39.28 R

[56] References Cited
UNITED STATES PATENTS
3,246,682  4/1966  McCombs .................... 60/39.28 R
3,002,348  10/1961  Haase .......................... 60/39.28 R

*Primary Examiner*—Clarence R. Gordon
*Attorney, Agent, or Firm*—Holman & Stern

[57] ABSTRACT

A fuel control system for a gas turbine engine comprises a main pump, an auxiliary pump supplying fuel from a reservoir to the main pump, a metering valve responsive to air pressure signals from the engine compressor, a pilot valve controlling at least one of the air pressure signals in responsive to electrical control signals, a first spill valve connected across the main pump and responsive to the pressure drop across the metering valve and to engine speed, a second spill valve operable in response to further electrical signals in the event of malfunction of the pilot valve to control fuel flow to the engine by spilling fuel from the metering valve outlet, the second spill valve also being responsive to an engine speed signal, and a pressurising valve responsive to an increase in pressure upstream of the main pump to increase the pressure at the metering valve outlet.

20 Claims, 5 Drawing Figures

FUEL CONTROL SYSTEM FOR GAS TURBINE ENGINE

This invention relates to a fuel control system for a gas turbine engine, and has as an object to provide a fuel control system in a convenient form.

According to the invention a fuel control for a gas turbine engine including a fuel reservoir, a main pump for supplying fuel from the reservoir to the engine, a metering valve downstream of the main pump, a pilot valve responsive to engine operating parameters and a spill valve for returning fuel from the metering valve outlet to a part of the system upstream of the said pump, the said spill valve comprising an inlet communicating with the metering valve outlet, an outlet communicating with a zone upstream of said pump, a closure member responsive to a servo operating pressure to open said outlet, and biasing means urging the closure member against the servo pressure, said servo pressure being derived from the pressure at the metering valve outlet and being responsive to the position of said pilot valve.

A fuel control system in accordance with the invention will now be described by way of example and with reference to the accompanying drawings, in which.

In the example shown the fuel control system is associated with a three-spool gas turbine engine.

Figure 1:
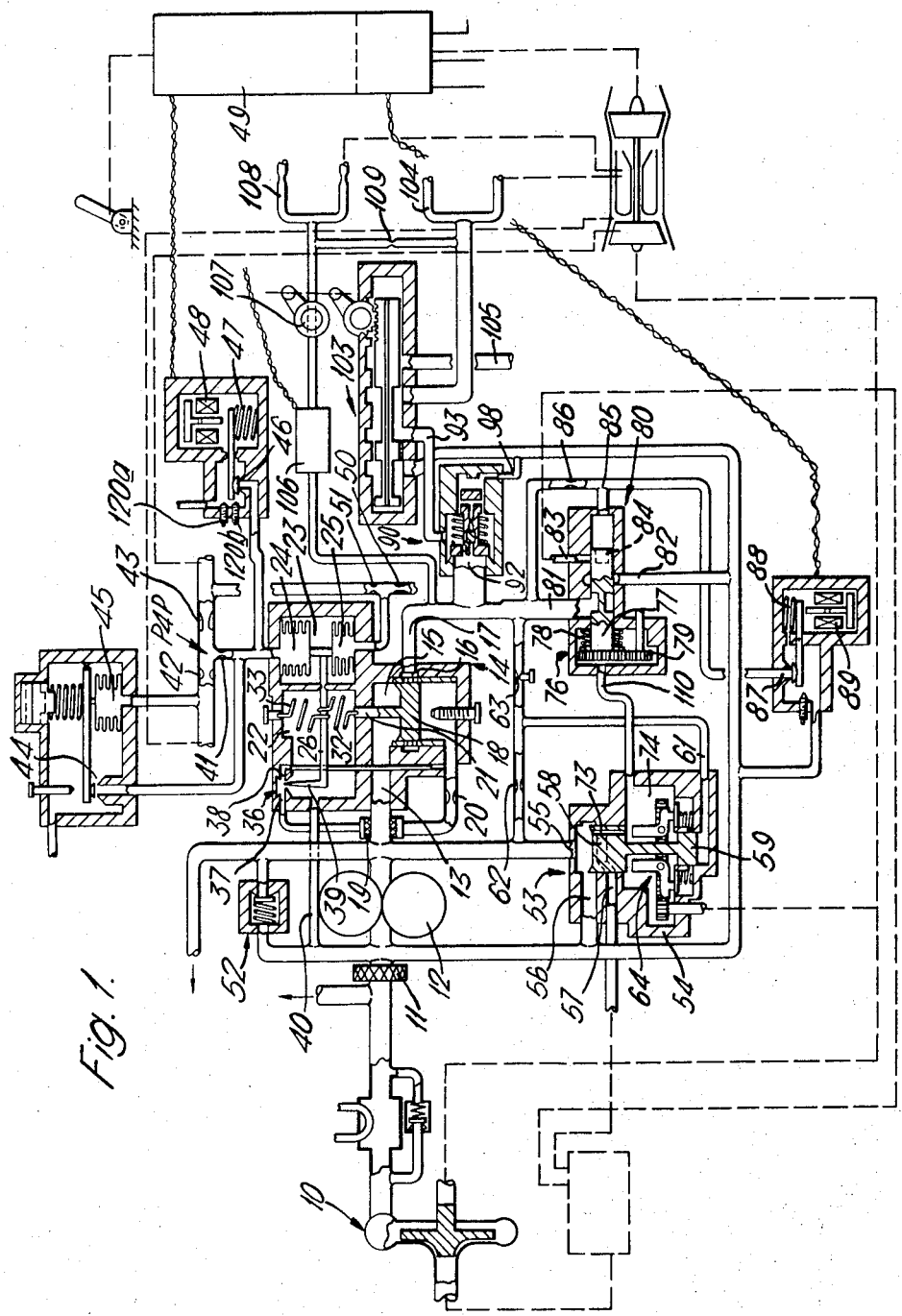
FIG. 1 is a diagram of a fuel control system.

Referring first to FIG. 1, a boost pump 10 supplies fuel from a tank (not shown) via a filter 11 to a pump 12. The outlet of the pump 12 is connected to an inlet 13 of a metering valve 14. Inlet 13 opens into a cylindrical chamber 15 within the valve 14, the chamber 15 having outlet ports 16 which communicate with a passage 17. A piston member 18 is slidable within the chamber 15 and provides, in combination with the ports 16, a variable metering orifice. Inlet 13 also communicates, via a filter 19 and a flow restrictor 20, with a side of the member 18 remote from the inlet 13.

Piston member 18 includes a stem 21 sealingly extending into a chamber 22 of the valve 14. A further chamber 23 of the valve 14 contains a pair of bellows 24, 25, respectively internally subjected, in use, to air pressure signals derived from the delivery pressure P4 of the engine compressor and from a pressure P3 derived from a second stage of the engine compressor. The free ends of the bellows 24, 25, are linked together and are connected to one end of a lever 26.

Figure 2:
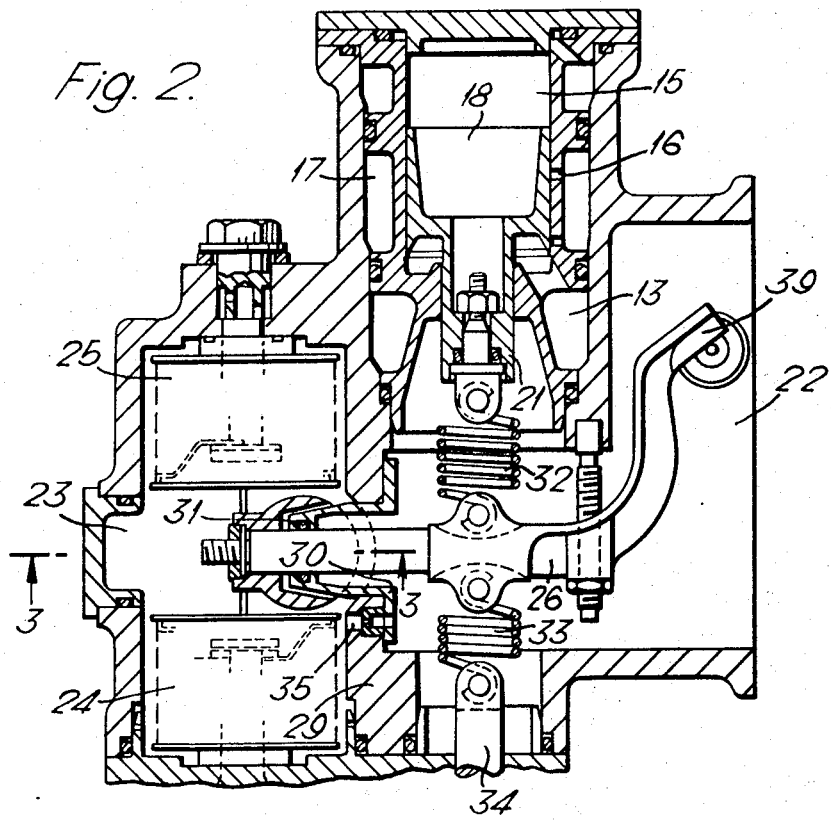
FIG. 2 is a section through a metering valve.
Figure 3:
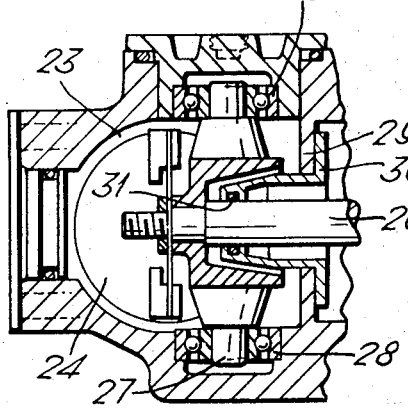
FIG. 3 is a section on line 3—3 in FIG. 2.

As shown in FIGS. 2 and 3 lever 26 is carried on a trunnion 27 supported in bearings 28 within the chamber 23. A wall 29 between chambers 22, 23 supports a mounting member 30 for a sealing ring 31. The ring 31 sealingly engages the member 30 and lever 26 so that the plane of the ring 31 passes through the axes of bearings 28. Lever 26 extends into chamber 22 and is coupled by a pair of extension springs 32, 33 respectively to the stem 21 and to an adjusting screw 34. A flow restrictor 35 within the wall 29 interconnects chamber 22, 23.

A fluidic device 36 comprises a pair of axially aligned nozzles 37, 38 and a blade 39, which forms part of the lever 26, disposed between the nozzles 37, 38 so as in use, to control flow of fluid therebetween. The nozzles 37, 38 are respectively connected to the filter 19 and to the chamber 15 on a side of the piston member 18 remote from the inlet 13. Between the nozzles 37, 38 the device 36 opens into the chamber 22, which in turn communicates via a passage 40 with the upstream side of the pump 12.

The bellows 24 is connected via a restrictor 41 to an air potentiometer formed by a pair of restrictors 42, 43 and communicating at its respective ends with pressures P4 and P3. Bellows 24 also communicates with an ambient pressure Po via a half-ball valve 44, actuable by a bellows 45 responsive to pressure P4, a rise in P4 above a predetermined value acting to open the valve 44. Bellows 24 is also connected to the ambient pressure Po via a further plate valve 46 whose travel is limited by a pair of adjustable stops 120a, 120b which is biased shut by a spring 47 which is operable to open by a solenoid 48. An electric control apparatus 49 supplies to the solenoid 48 a current which is variable in accordance with the position of a throttle control for the engine, and also in accordance with the engine speed, the arrangement being such that a movement of the throttle in a direction to increase engine speed causes valve 46 progressively to close, and an increase in engine speed causes valve 46 progressively to open. Bellows 25 is connected to an air potentiometer formed by a pair of flow restrictors 50, 51 which respectively communicate with pressures Po and P3.

A spring-loaded relief valve 52 is connected in parallel with the pump 12. Also connected in parallel with the pump 12 is spill valve arrangement 53, also shown in FIG. 4. Valve 53 comprises a body 54 having an inlet 55 communicating with the inlet 13 of the valve 14 and a pair of outlet ports 56, 57 communicating respectively with the upstream side of the pump 12 and with the fuel tank. A closure member 58 is slidable in the body 54 and is coupled by a stem 65 to a piston element 59 slidable in a part 60 of the body 54. Member 58 and element 59 have respective axial extensions 71, 72 which are interengaged so as to allow limited relative angular movement between the member 58 and element 59 as a result of torsion in stem 65. Closure member 58 includes a passage 73 through which fuel can enter a chamber 74 of the valve 53. Piston element 59 is responsive to a biasing pressure in a line 61 and also the pressure in chamber 74. The biasing pressure in line 61 is derived from a potentiometer arrangement comprising a pair of flow restrictors 62, 63 connected across the valve 14 between inlet 13 and passage 17.

The closure member 58 is also urged against the pressure in the chamber 74 by a flyweight arrangement 64 responsive to the speed of the engine. The arrangement 64 comprises a number of weights 66 pivotally mounted on a flanged portion 67 of the closure member 58. Portion 67 is formed as a spur gear and is engaged with a pinion driven by the engine. Weights 66 have projections 68 which engage a further spur gear 69 slidably and rotatably mounted on the body part 60. Spur gear 69 also meshes with the pinion and is supported by a bearing member 75 which is biased towards the inlet 55 by a spring 70. Weights 66 are of a relatively low-density material, as for example aluminum, for reasons which are later described.

Chamber 74 communicates, via a passage 110, with a piston and cylinder unit 76. The piston 77 of the unit 76 is biased against the pressure in the passage 110 by a spring 78. Piston 77 is also formed as a spur gear and is rotatable by a pinion 79 driven by the engine. A valve 80 has an inlet 81 communicating with passage 17, a pair of outlet ports 82, 83 communicating respectively with an upstream side of the pump 12 and with the fuel tank, and a closure member 84 coupled to the piston 77 and actuable thereby in response to a pressure in the passage 110 successively to uncover the ports 82, 83. Closure member 84 is also subjected to a biasing pressure in a passage 85 and opposing the pressure in passage 110. The pressure in passage 85 is derived via a restrictor 86 from the pressure in the passage 17. Passage 85 communicates with the upstream side of the pump 12 via a half-ball valve 87 which is biased shut by a spring 88 and is operable against the spring 88 by a solenoid 89. The electric control apparatus 49 is so arranged that in the event of a malfunction of the solenoid 48, or of an associated part of the apparatus 49, a variable current is supplied to the solenoid 89 to control the valve 87 in accordance with the position of the engine throttle control and with the engine speed.

Figure 5:
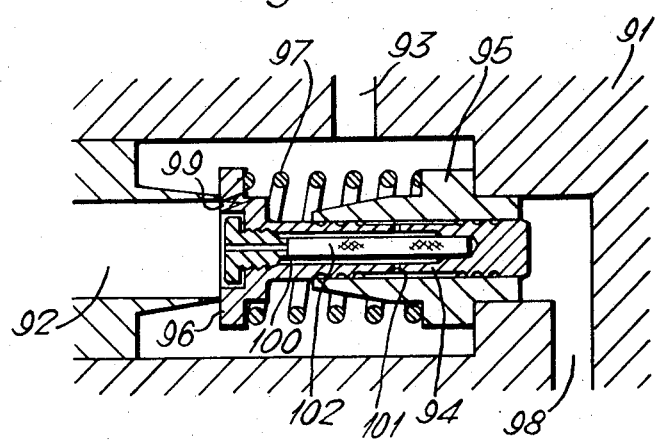

A pressurising valve 90, also shown in FIG. 5 comprises a body 91 formed with an inlet 92 and an outlet 93. Inlet 92 communicates with passage 17. A piston member 94 is slidable in a part 95 of the body 91 and includes a closure member 96. Closure member 96 is biased against the inlet 92 by a spring 97 and by the pressure in a passage 98 which operates on the piston 94. Passage 98 communicates with an upstream side of the pump 12. The closure member 96 has a restricted through passage 99 by means of which the inlet 92 communicates with the outlet 93. Piston 94 has an axial bore 100 communicating with the inlet 92 and a plurality of treansverse bores 101 which open on to the surface of the piston within the part 95. The bore 100 contains a filter element 102 through which fuel passing, in use, from the inlet 92 to the bores 101 passes.

Outlet 93 of the valve 90 communicates via a spool-type shut-off valve 103 with passages 104 leading to the burners of the engine. With the valve 103 in its shut off condition outlet 93 communicates with the upstream side of the pump 12 and passages 104 communicate via a dump connection 105 with a dump tank. Passage 17 communicates via a solenoid valve 106 and a shut-off cock 107 with passages 108 leading to starter jets for the engine. Passages 104 and 108 are interconnected via a restrictor 109. Solenoid valve 106 is operable by the control apparatus 49 to regulate the amount of fuel admitted to the starter jets.

In use, fuel is supplied from the tank by the boost pump 10 via the filter 11 to the pump 12. Fuel from the pump 12 enters the valve 14 via the inlet 13 and acts upon the member 18 in a direction to open the valve 14. Fuel pressure at the inlet 13 is applied, via filter 19 to the nozzle 37 of the device 36. Fuel escaping from device 36 passes into chamber 22, which contains fuel at a pressure equal to that delivered by the pump 10. Fuel pressure recovered at nozzle 38 is applied to member 18 to oppose the pressure at the inlet 13. The pressure at nozzle 38 is dependent on the position of blade 39 and lies between the pressure at the inlet 13 and the pressure in chamber 22.

A pressure $P_4P$, intermediate the pressures $P_4$ and $P_3$, is derived from the potentiometer formed by restrictors 42, 43. A pressure $KP_4P$, intermediate the pressure $P_4P$ and $P_o$, is derived from the potentiometer formed by restrictor 41 and valve 46, and is applied to the bellows 24. The value of pressure $KP_4P$ is limited by the valve 44, which operates to protect the engine from excessively high values of $P_4$. The value of $KP_4P$ is also controlled, via valve 46, by the control apparatus 49 as previously described. An increase in pressure $KP_4P$ due, interalia, to an increase in $P_4$ or to a decrease in engine speed, or to movement of the throttle in a direction to increase engine speed, results in rotation of lever 26 clockwise, as seen in FIG. 1, so that blade 29 is moved progressively into alignment with nozzles 37, 38, thereby allowing piston member 18 to move, under the influence of pressure at inlet 13, to increase fuel flow. This movement of member 13 exerts, via spring 32, a force urging lever 26 anti-clockwise. Lever 26 thus adopts an equilibrium position in which the forces exerted by springs 32, 33 substantially balance the forces exerted by bellows 24, 25. A decrease in pressure in the bellows 24 similarly acts to reduce fuel flow through the valve 14.

Chamber 23 is subjected internally, via flow restrictor 35, to the same internal pressure as chamber 22. Seal 31 normally has, therefore, no pressure difference across it, and its life is greatly extended. In the event of failure of either of the bellows 24, 25 flow of fuel into the engine compressor or to the valves 44, 46 is limited to that which can pass through the restrictor 35. Seal 31 therefore becomes effective only in the event of failure of the bellows 24, 25.

Figure 4:
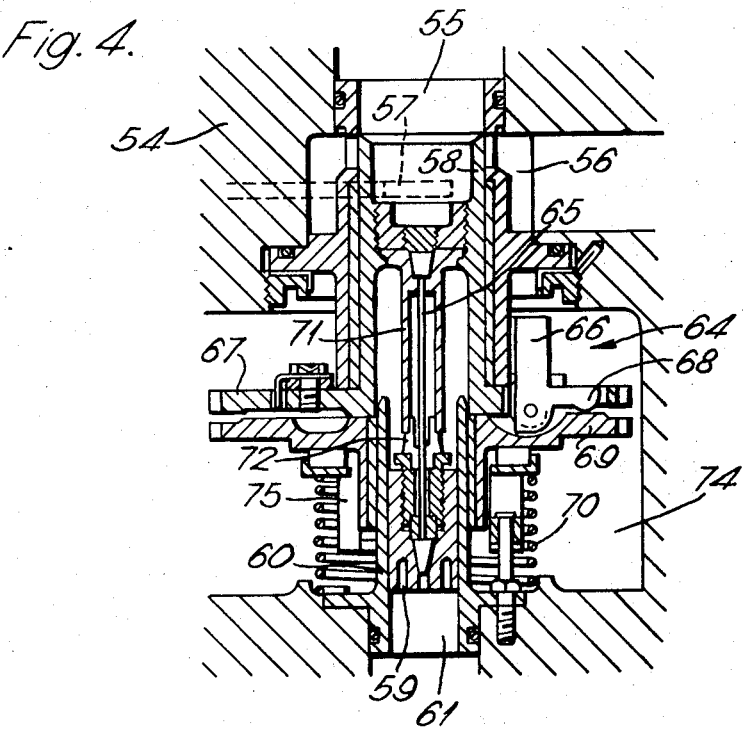
FIGS. 4 and 5 are sections through valves forming part of the system shown in FIG. 1.

Pressure drop across restrictor 62 is proportional to the pressure drop across valve 14. Pressure at inlet 55 of valve 53 is applied, via passage 73 in closure member 58, to one side of piston element 59. The pressure between restrictors 62, 63 is applied via line 61 to the other side of piston element 59. Element 59 is thus subjected to a servo pressure drop proportional to the pressure drop across the valve 14 and tending to move the closure member 58 in a direction which will cause first port 56 and then port 57 to be uncovered. An increase in the speed of the engine urges weights 66 outwards to move spur gear 69 downwards, as shown in FIG. 4, against spring 70 until bearing member 75 engages the valve body 54. Any further increase in engine speed moves the closure member 58 in a direction to shut ports 56, 57.

Valve 53 thus operates to maintain the pressure at inlet 13 of the metering valve 14 at a level dependent on the pressure drop across the valve 14 and on the engine speed, provided the latter is sufficient to move the weights 66 against the spring 70. For a given engine speed, therefore, there is a corresponding pressure difference across valve 14. When port 57 is open fuel is returned to the tank instead of immediately being recirculated through the pump 12. Rotation of the spur gear 69 and of the piston element 59 by the stem 65 minimises the effects of static friction. The inter-engaged extensions 71, 72 of the member 58 and element 59 respectively, prevent undue torque loads from being applied to the stem 65.

The provision of low density flyweights 66, as above described, has the effect that the force exerted by weights 66 to shut ports 56, 57 is less for fuels of high density than for fuels of low density. Correspondingly greater amounts of high density fuel are spilled. The calorific value of fuel reaching the engine for a given orifice size of valve 14 is thus substantially constant.

Te pressurising valve 90 has its inlet 92 subjected to the pressure in passage 17, which pressure tends to lift the closure member 96 against the bias of the spring 97 and the pressure in passage 98 acting on piston member 94. Fuel from the inlet 92 passes into the axial bore 100 via the filter element 102 and transverse bores 101 to the bore of the part 95 to provide a fluid bearing. When the valve 90 is shut sufficient fuel can pass through the restrictor 99 to enable the burners of the engine to be lit initially.

The pressure in passage 98 is the same as that at the inlet of the pump 12, and this pressure rises when fuel flow to the engine is at a low level. In this condition the increased pressure in passage 98 assists the spring 97 to maintain the pressures in passage 17, nozzle 37 of valve 14, and inlet 55 of valve 53 at levels sufficiently above the pressure in the inlet of pump 12 to ensure correct functioning of valves 14, 53 and 80.

At higher levels of fuel flow to the engine the pressure in passage 98 is reduced and piston 94 is urged in a direction to open closure member 96 to permit fuel to pass to outlet 93 without a significant pressure loss. At these higher levels of fuel flow the pressures in passages 17, nozzle 37 and inlet 55 are adequate to ensure correct operation of valves 14, 53 and 80. The relatively low pressure loss through valve 80 at higher levels of fuel flow avoids unnecessary loading on pump 12.

The pressure in passage 110 is equal to the pressure in inlet 55 of valve 53, together with a small additional pressure component due to centrifugal action within chamber 74, passage 110 communicating with chamber 74 at its periphery. Valve 87 normally remains shut under the influence of spring 88. Pressure in passage 85 is in these circumstances equal to the pressure in passage 17. Valve 80 is in these circumstances biased shut by spring 78.

Malfunction of solenoid 48 or apparatus 49 causing spring 47 to shut valve 46, will result in valve 14 becoming wide open and, since there will then be no pressure drop across valve 14, valve 53 shutting completely. In these circumstances solenoid 89 is operated under control of a separate part of apparatus 49 to cause restrictor 86 and valve 87 to act as a potentiometer and thus to vary the pressure in passage 85 in accordance with the position of the engine throttle and the engine speed. Fuel supply is effectively controlled by valve 80, which acts to spill excess fuel from passage 17 back to the inlet of pump 12 or to the fuel tank.

I claim:

1. A fuel control system for gas turbine engine, including a fuel reservoir, a main pump for supplying fuel from the reservoir to the engine, a metering valve downstream of the main pump, a pilot valve responsive to engine operating parameters and a spill valve for returning fuel from the metering valve outlet to a part of the system upstream of the said pump, the said spill valve comprising an inlet communicating with the metering valve outlet, an outlet communicating with a zone upstream of said pump a closure member responsive to a servo operating pressure to open said outlet and biasing means urging the closure member against the servo pressure, said servo pressure being derived from the pressure at the metering valve outlet and being responsive to the position of said pilot valve.

2. A system as claimed in claim 1 in which said spill valve closure member is also responsive to a pressure signal dependent on engine speed and opposing said servo operating pressure.

3. A system as claimed in claim 2 which includes a further spill valve having an inlet communicating with the metering valve inlet, a pair of outlets respectively communicating with the pump inlet and with the reservoir and a control member responsive to the pressure drop across said metering valve and also to a signal dependent on the engine speed to successively uncover said further spill valve outlets.

4. A system as claimed in claim 3 in which said further spill valve includes a flyweight arrangement rotatable in a chamber which communicates with said metering valve inlet and with the first mentioned spill valve, a centrifugal pressure in said chamber providing, in use, said fuel pressure signal.

5. A system as claimed in claim 2 in which said biasing means comprises a spring urging said closure member against said fuel pressure signal.

6. A system as claimed in claim 1 in which said metering valve comprises a body having an inlet and an outlet, first and second chambers within the body, pressure sensitive means within the first chamber internally subjected to air pressure signals derived from the compressor of the engine, the said signals being variable in accordance with engine operating conditions, a control member operatively connected to the pressure sensitive means and sealingly extending into the second chamber, means within the second chamber for generating a signal pressure in accordance with the postiion of the control member, a metering orifice within the body, a control element movable in response to the servo pressure to vary the flow of fluid through the metering orifice and a flow restrictor interconnecting the first and second chambers.

7. A system as claimed in claim 6 in which the said pressure sensitive means comprises a pair of bellows units are internally subjected to air pressure signals which are respectively derived from the output and from an intermediate stage of the engine compressor.

8. A system as claimed in claim 6 in which the servo pressure generating means comprises a pair of axially aligned nozzles and a blade movable between said nozzles by said control member to control the fraction of the pressure within one of the nozzles which is recovered by the other nozzle.

9. A system as claimed in claim 8 in which said one nozzle communicates with the inlet of the metering valve.

10. A system as claimed in claim 8 in which the zone between said nozzles communicates with a third chamber within the metering valve said third chamber being subjected, in use, to a pressure lower than that at the inlet of the metering valve.

11. A system as claimed in claim 6 in which said control element comprises a piston slidable in a bore, said piston being subjected on its respective sides to the pressure at inlet of the metering valve and to said signal pressure.

12. A system as claimed in claim 11 which includes a flow restrictor by means of which the part of said bore subjected to said signal pressure communicates with the inlet of the metering valve.

13. A system as claimed in claim 6 in which the control member comprises a lever, and which includes a trunnion pivotally mounting the lever in said body, the portion of the wall between said first and second chambers through which said lever sealingly extends lying closely adjacent the trunnion axis.

14. A system as claimed in claim 7 which includes a first air potentiometer arrangement, to opposite ends of which pressures derived from the engine compressor are respectively, in use, applied, one of said bellows units being connected to a mid-point of said first potentiometer arrangement, a second air potentiometer arrangement to opposite ends of which a low air pressure and said pressure from the compressor intermediate stage are respectively applied, the other of said bellows units being connected to a mid-point of said second potentiometer arrangement.

15. A system as claimed in claim 14 which includes a further pilot valve operable to control the pressure applied to said one bellows unit.

16. A system as claimed in claim 15 which includes an electric control apparatus responsive, inter alia, to engine speed and the position of a throttle control for the engine to provide a first electrical control signal, said further pilot valve being responsive to said first electrical signal.

17. A system as claimed in claim 16 in which said electric control apparatus is adapted to provide, during a malfunction of said apparatus or of further pilot valve, a second electrical signal, the first-mentioned pilot valve being responsive to said second electrical signal to cause the first-mentioned spill valve to control fuel flow to the engine.

18. A system as claimed in claim 1 which includes a further, low pressure, pump for supplying fuel from the reservoir to the main pump inlet and a pressurising valve, said pressurising valve having an inlet and an outlet, a closure element movable in response to pressure at the inlet to open the pressurising valve, biasing means urging the closure element in a direction to shut the pressurising valve and a piston arrangement operatively connected to the closure element and subjected, in use, to the pressure at the main pump inlet so as to urge the closure member to shut the valve.

19. A system as claimed in claim 18 which includes a restricted passage by means of which the inlet of said pressurising valve communicates with the outlet thereof.

20. A system as claimed in claim 18 in which said closure element includes a piston portion having an axial bore communicating with the pressuring valve inlet and a plurality of transverse bore communicating with said axial bore and opening on to the periphery of the piston.

* * * * *